Nov. 10, 1942. R. I. WILCOX 2,301,908
REMOTE CONTROL DEVICES FOR AUTOMATIC PHONOGRAPHS
Filed July 29, 1938  5 Sheets-Sheet 1

Inventor,
Russell I. Wilcox,
by Walter P. Guyer
Attorney.

Nov. 10, 1942.  R. I. WILCOX  2,301,908
REMOTE CONTROL DEVICES FOR AUTOMATIC PHONOGRAPHS
Filed July 29, 1938  5 Sheets-Sheet 2

Inventor,
Russell I. Wilcox,
by Walter P. Guyer
Attorney.

Nov. 10, 1942.    R. I. WILCOX    2,301,908
REMOTE CONTROL DEVICES FOR AUTOMATIC PHONOGRAPHS
Filed July 29, 1938    5 Sheets-Sheet 3

Inventor
Russell I. Wilcox,
by Walter P. Geyer
Attorney.

Nov. 10, 1942.                R. I. WILCOX                2,301,908
            REMOTE CONTROL DEVICES FOR AUTOMATIC PHONOGRAPHS
                    Filed July 29, 1938        5 Sheets-Sheet 4
Fig. 7.          Fig. 8.
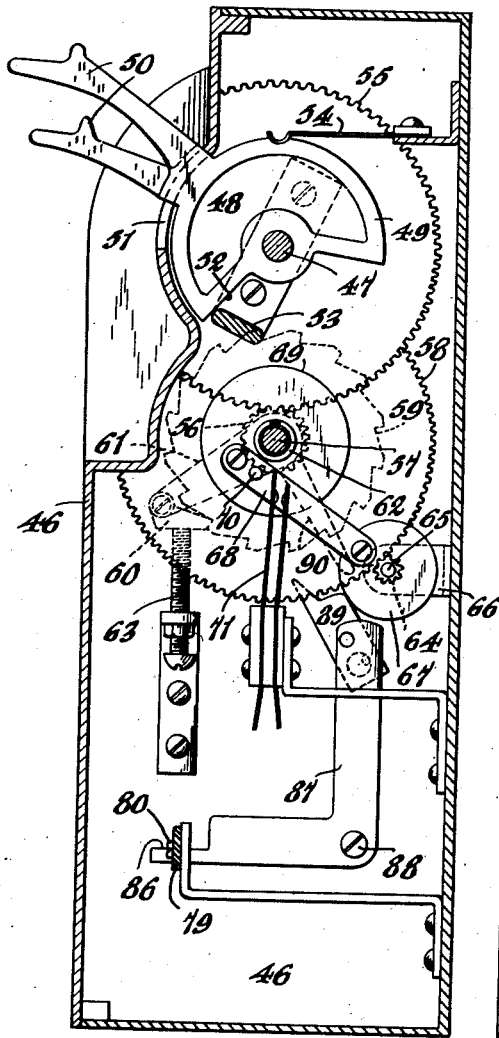
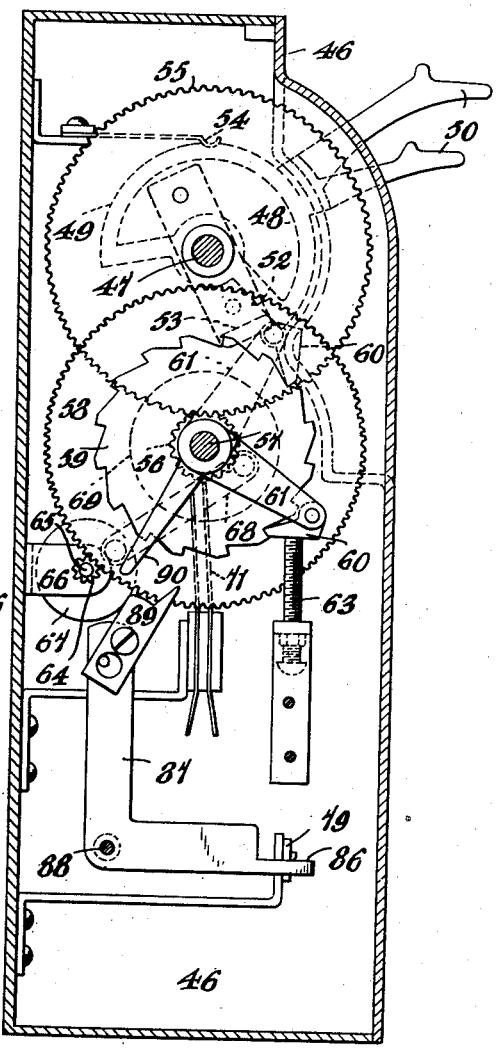
Fig. 9.
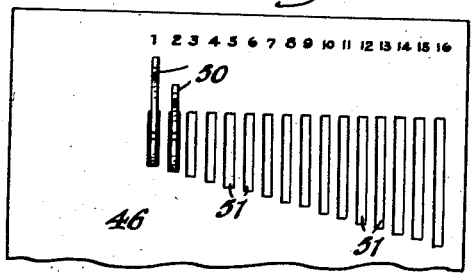
Inventor,
Russell I. Wilcox,
by Walter P. Guyer
            Attorney.

Nov. 10, 1942.                R. I. WILCOX                 2,301,908
               REMOTE CONTROL DEVICES FOR AUTOMATIC PHONOGRAPHS
                    Filed July 29, 1938           5 Sheets-Sheet 5
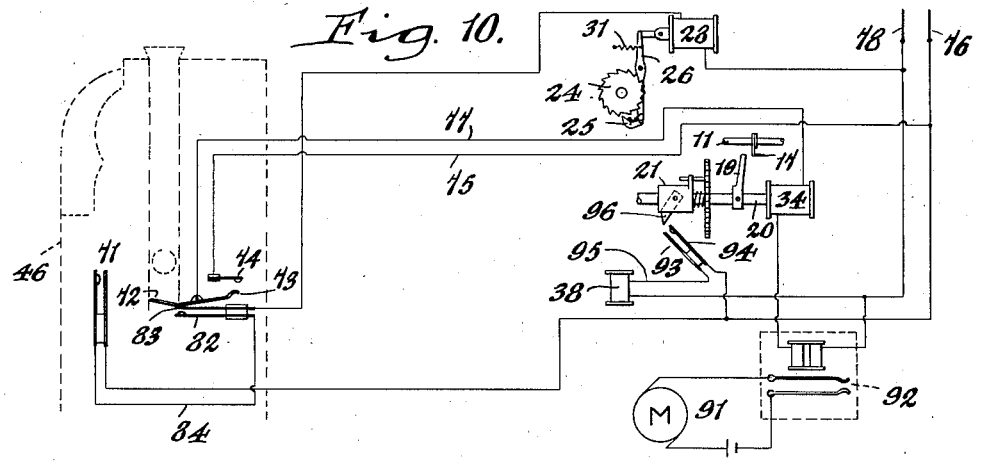
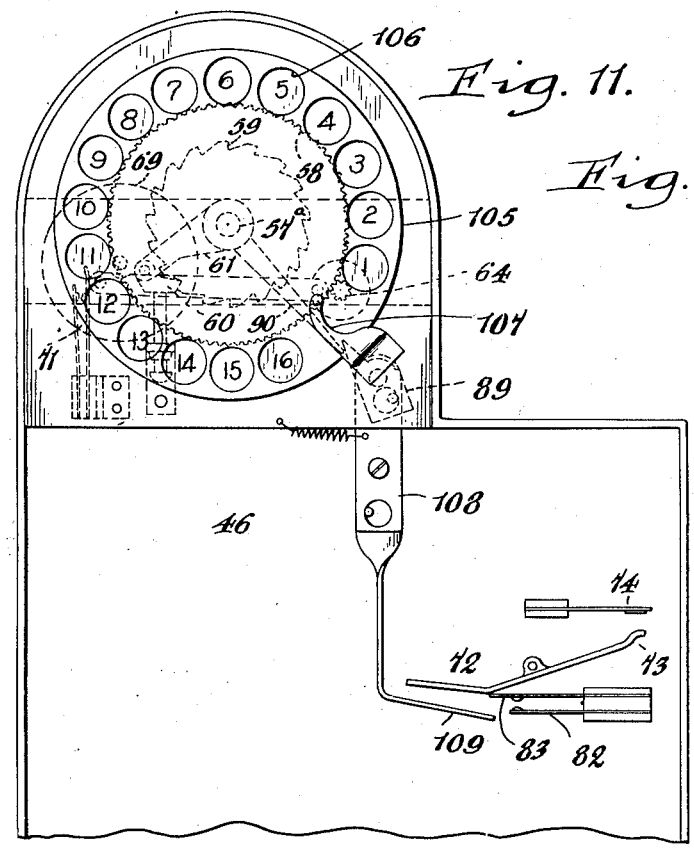
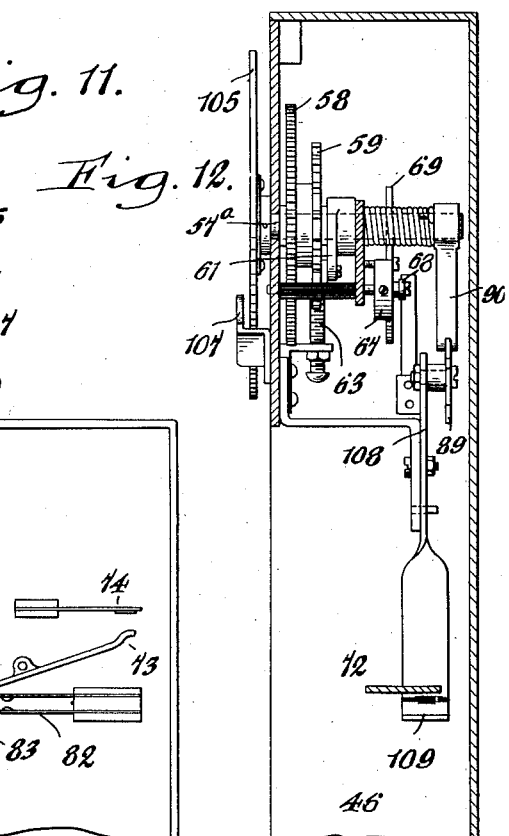
Inventor,
Russell I. Wilcox,
by Walter P. Geyer
Attorney Patented Nov. 10, 1942

2,301,908

UNITED STATES PATENT OFFICE 2,301,908

REMOTE CONTROL DEVICE FOR AUTOMATIC PHONOGRAPHS

Russell I. Wilcox, Berwyn, Ill., assignor to The Rudolph Wurlitzer Company, North Tonawanda, N. Y., a corporation of Ohio Application July 29, 1938, Serial No. 221,958

12 Claims. (Cl. 74—479)

This invention relates to certain new and useful improvements in remote control devices for automatic selective phonographs and the like.

It has for one of its objects to provide a remote control device of this character which is simple in construction and reliable in operation, and which is so designed and constructed as to be readily applicable for operative connection to the multi-selective type of phonograph, and whereby a patron at a remote point from the instrument may readily select desired records.

Another object of the invention is to provide a remote, coin-controlled selective device which is particularly applicable to the push-button type of selective phonograph, and wherein a selection made at the wall box of the device is automatically registered with the companion push button of the instrument, after which other automatic means provide for the movement of such push button to a selective position.

Other features of the invention reside in the construction and arrangement of parts hereinafter described and particularly pointed out in the appended claims.

In the accompanying drawings—

Figure 1:
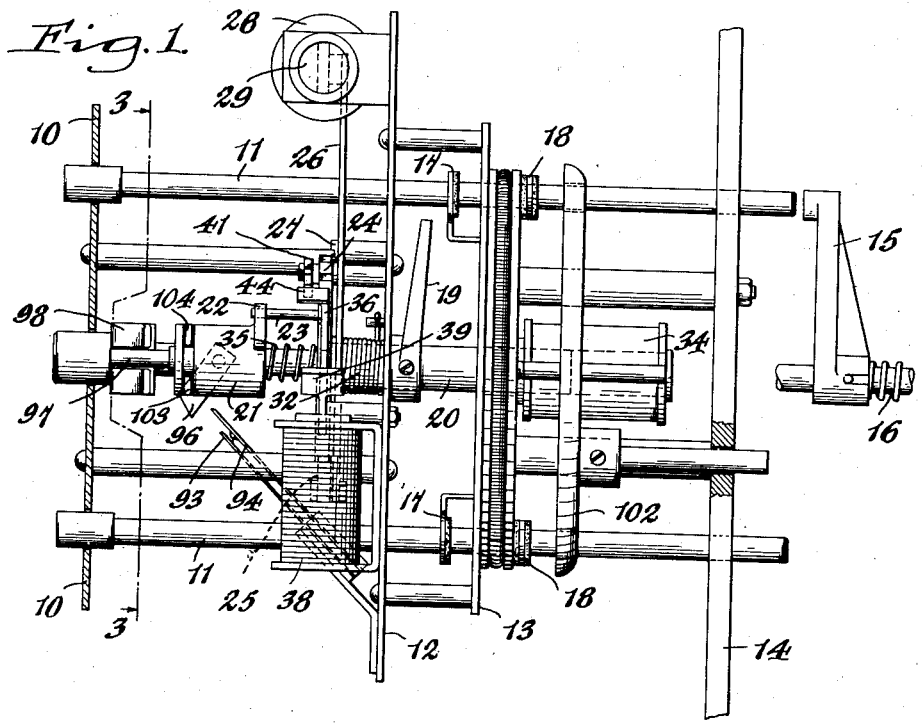
Figure 2:
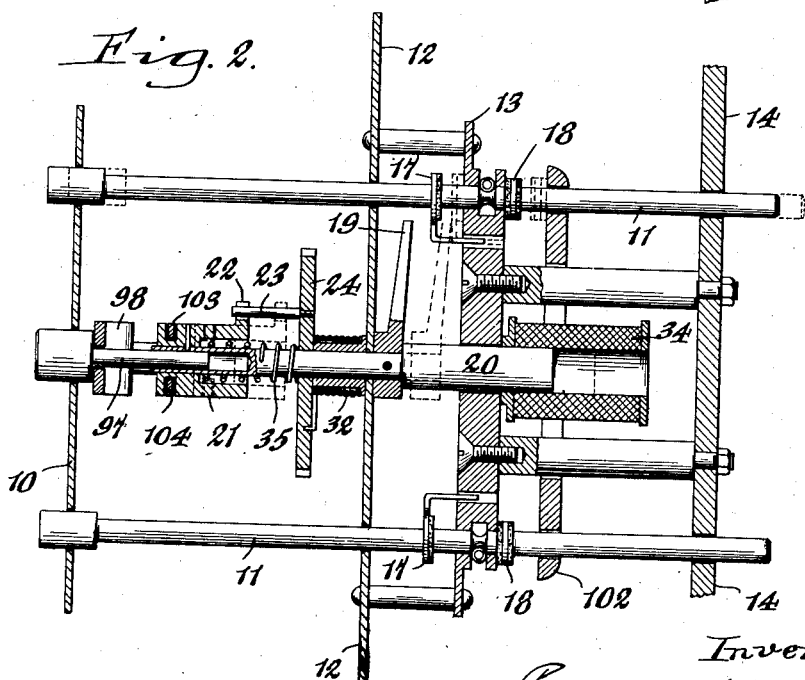
Figure 3:
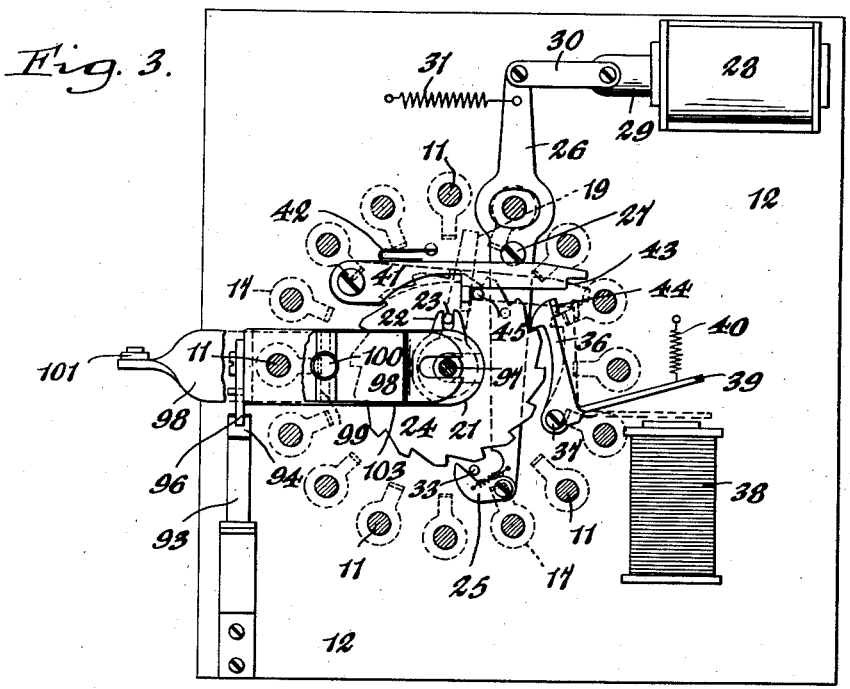
Figure 4:
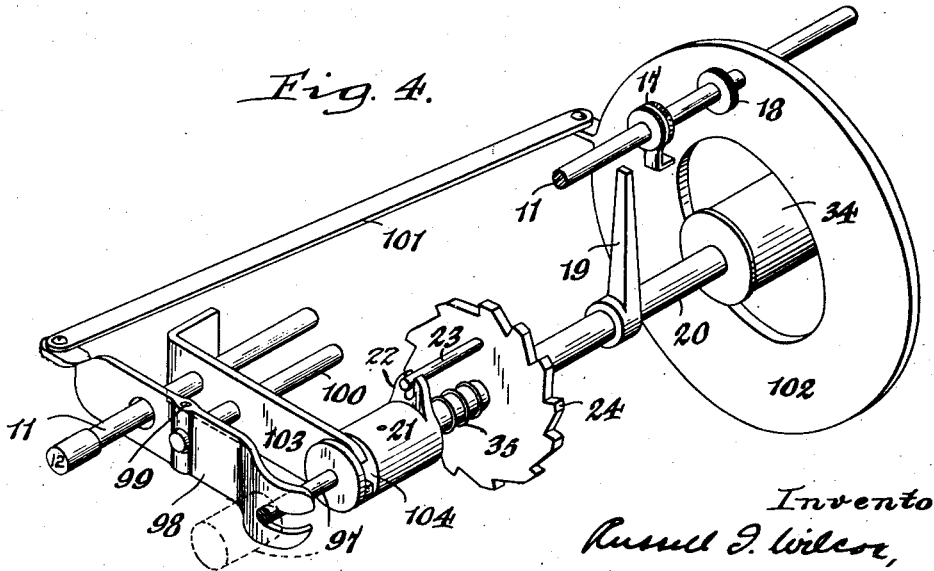
Figure 6:
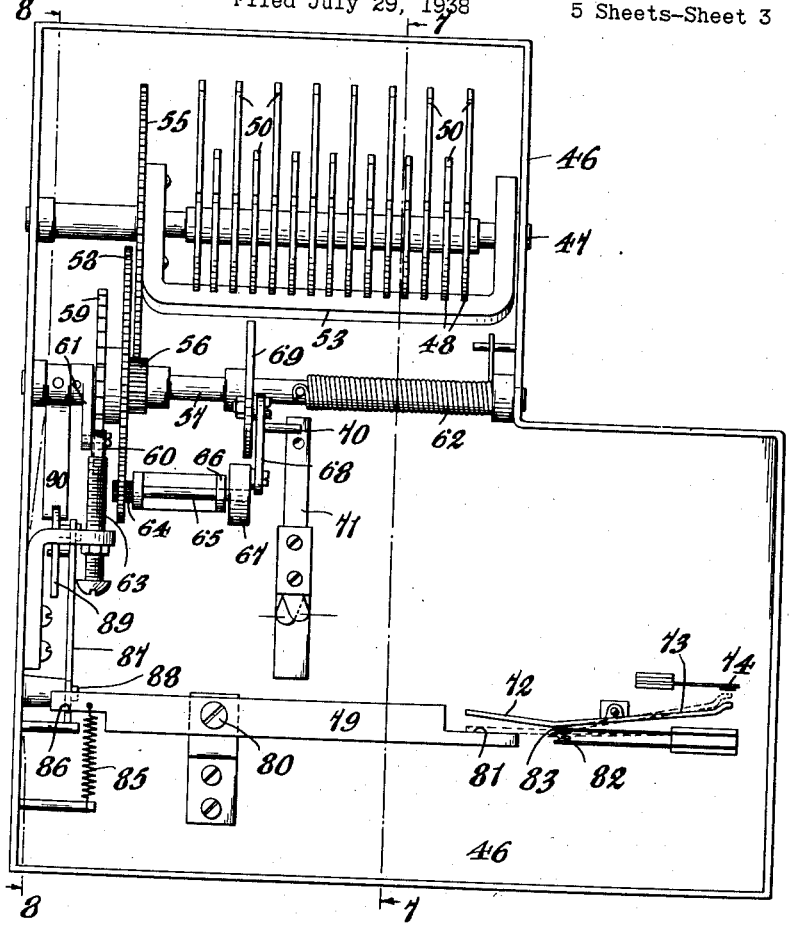
Figure 5:
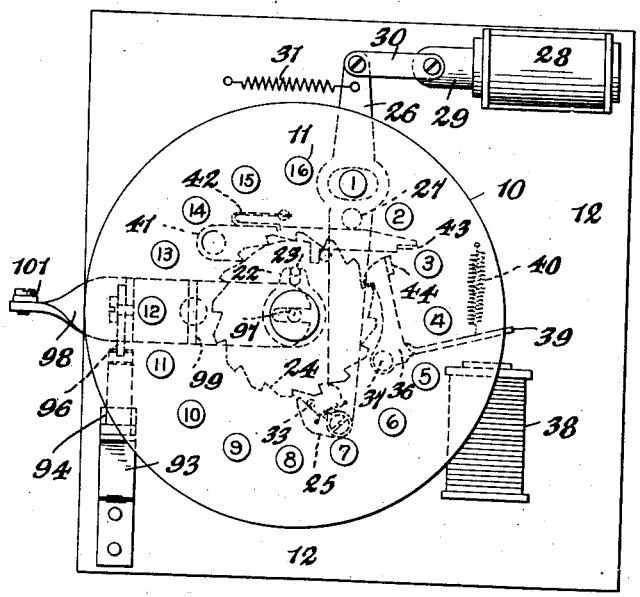

Figure 1 is a side elevation, partly in section, of the selective push button assembly of an automatic phonograph showing my invention associated therewith. Figure 2 is a central, longitudinal section thereof. Figure 3 is a cross section taken on line 3—3, Figure 1. Figure 4 is a perspective view of the remote-controlled push button assembly and associated parts. Figure 5 is a front elevation of the phonograph push button dial and associated parts. Figure 6 is a front elevation, with the cover removed, of the selector-controlled wall box and parts associated therewith. Figures 7 and 8 are enlarged transverse, vertical sections taken on the correspondingly-numbered lines in Figure 6. Figure 9 is a fragmentary front elevation of the selecting lever panel of the wall box, showing the progressively longer lever-engaging slots. Figure 10 is a wiring diagram of the remote control device. Figure 11 is a front view of a modified form of remote selection at the wall box. Figure 12 is a side view thereof, partly in section.

This remote control mechanism has been designed more particularly for the selective type of phonograph, such for example as the multi-selector type shown in my Patent No. 2,002,236, dated May 21, 1935, and wherein the selection of records at the phonograph is effected by push rods or buttons and which elements determine the playing of the records selected. In the present invention, I employ remote control means for automatically actuating the selector rods or buttons of the phonograph, such means comprising a revolving selector control arm disposed in operative relation with the selector push buttons of the phonograph to be selectively positioned in line with one or another of the buttons corresponding to the record selected for play at the wall box or remote control station and to be axially shifted at a predetermined time to move the selected push button to an operative position to select a record for play; and actuating mechanism operatively associated with such control arm for governing its selective operating movements and for governing the restoration of such parts to their initial position. This remote control mechanism is coin-controlled so that upon the deposit of a coin and the selection of a desired record at the remote control station, the selecting operation will subsequently be automatically performed at the phonograph.

In Figures 1 and 2 of the drawings, the numeral 10 indicates the selector button panel of the phonograph shown in my aforesaid patent and 11 indicates the record-selecting push rods or buttons which are disposed in annular fashion to correspond in number to the records borne by the instrument. These push rods are suitably guided for axial movement to and from a selective position in suitable supporting plates 12, 13 and 14, and when moved to a projected selected position, their inner ends are disposed in the path of a rotatable stop arm 15 applied to the selector shaft 16 of the phonograph so that when the selector mechanism of the latter is rendered operative the selector shaft 16 is rotated and as its arm 15 abuts one or another of the projected push rods, it arrests the rotation of the selector shaft to in turn effect the automatic selection of the record desired for play, all as shown in my Patent No. 2,002,236. Spaced collars 17, 18 fixed on each of the push rods, serve to limit the projected and retracted movements of such rod, the collar 17 abutting the front side of the supporting plate 13, when its push rod is projected, and the companion collar abutting the rear face of such plate when the push rod is retracted to its initial position.

Associated with the push button assembly of the phonograph, is a selector-control arm 19 which is fixed radially to a combined rotatable and axially shiftable shaft or plunger 20 supported in the adjoining plates 12, 13 and disposed axially of the center about which the push rods 11 are arranged. Fixed on the hollow front end of the shaft 20 is a collar 21 having a forked projection 22 thereon with which a projecting pin 23 of a ratchet wheel 24, loosely mounted on said shaft, is adapted to be coupled, so that during rotation of the ratchet wheel motion is transmitted therefrom to the shaft and its selector arm 19 and during axial movement of such shaft its collar 21 remains coupled with the ratchet wheel. This selector-control arm is adapted to selectively register at its outer end with one or another of the push rods 11 through the medium of its collar 17 and when arrested at a given selected position it is adapted to be shifted axially into engagement with such collar to project the selected push rod to a record-selecting position. The ratchet wheel 24 serves to effect the rotation of the selector arm 19 to an operative selective position and to this end a feed pawl 25 is provided which is applied to the lower end of a rock lever 26 pivoted at 27 to the front side of the supporting plate 12 and adapted to be oscillated back and forth in any appropriate remotely-controlled fashion to advance the ratchet wheel in a clockwise direction a predetermined distance to pre-set the selector arm in proper radial registering relation with the push rod companion to a given remotely-selected record. As shown in Figures 1 and 3, the remote control advancement of the ratchet wheel 24 and the selector control arm may be effected by means of a solenoid 28 included in the remote control assembly and circuit hereinafter described and having its plunger 29 connected by a link 30 with the upper end of the rock lever 26. Upon intermittent energization of the solenoid, the rock lever is actuated in a direction to actuate the ratchet wheel a distance of one tooth, and upon the de-energization of the solenoid, a spring 31 returns the solenoid plunger and the rock lever to initial position. A spring 32 connected to the ratchet wheel 24 tends to rotate it in a counter-clockwise direction, and, in the retracted position of the rock lever 26, the feed pawl 25 is held out of engagement with the ratchet wheel 24 by a pin 33 which is adapted to abut against the pawl in the manner shown in Figure 3.

The axial movement of the shaft or plunger 20 to shift the selector-control arm 19 in a forward direction to project a registering push rod 11 to a record-selecting position, is adapted to be actuated in any appropriate remotely controlled fashion, as for example, by a solenoid 34 operatively associated with the shaft or plunger, in the manner shown in Figure 2, such shaft or plunger constituting the actuated element or plunger of the solenoid. Upon energization of this solenoid, the plunger 20 and its selector control arm 19 is shifted forwardly to project a selector rod to a selective position and upon the de-energization of such solenoid a spring 35 applied to the plunger 20 and interposed between the shaft collar 21 and ratchet wheel 24 serves to restore the solenoid plunger and selector control arm to its initial position. During the reciprocating movements of the shaft or plunger 20, its collar 21 remains in rotative coupling engagement with the ratchet wheel 24 through the medium of the connection 22, 23.

Also associated with the ratchet wheel 24 is an escapement pawl or dog 36 pivoted at 37 on the supporting plate 12 alongside the ratchet wheel which normally serves to prevent movement of the latter in a counter-clockwise direction uder the tension of the spring 32. This pawl is adapted to be released from engagement with the ratchet wheel during restoring movements of the ratchet and associated parts and for this purpose is remotely controlled in any appropriate fashion, as through the medium of an electromagnet 38, the pawl having an extension 39 thereon which serves as an armature so that when the magnet is energized, the pawl is retracted from engagement with the ratchet wheel. A spring 40 constantly urges the pawl to a normal position in engagement with the ratchet wheel. It is desirable to retain the escapement pawl 36 out of engagement with the ratchet wheel 24 for a longer duration of time than that effected by the magnet 38 and for this purpose I provide a pivoted keeper 41 normally urged to swing downwardly by a spring 42 and having a shoulder 43 at its free end adapted to interlock behind a lateral projection 44 formed on the pawl 36 when the latter has been shifted to a retracted position by the magnet 38. At a predetermined time in the cycle of operation, when the ratchet wheel 24 is urged by its spring 32 in a counter-clockwise direction, a pin 45 projecting from the face of the ratchet wheel is adapted to encounter the pivoted keeper 41 and lift it from interlocking engagement with the pawl 36, thereby permitting that pawl to return to its normal position in engagement with the ratchet wheel. In the normal position of the parts, the push rod control arm 19 will assume a position about half way between the lowest and highest numbered push rods 11, so that if the phonograph is equipped with a coin device and coins are deposited therein, selections of records can be made only with the instrument push buttons.

The remote control unit, which governs the push button control mechanism of the phonographs, includes manual selector elements corresponding in number to the push rods 11 and is coin-controlled, and as shown in the drawings, is designed for the deposit of one coin at a time, say, a nickel. Upon the deposit of such a coin, an electric circuit is closed at one point in preparation for automatically closing the circuit at other points including the solenoids 28 and 34 and the electromagnet 38 for effecting the automatic selection of a desired record which has been selected from the remote control unit or wall box. This control unit is preferably constructed as follows:

The operative parts of this unit are arranged in a wall box or casing 46 which may be mounted at any desired point remote from the phonograph to be controlled and pivotally mounted on a horizontal shaft or pivot rod 47 supported in the upper portion of the casing are a plurality of independently-movable selector elements 48 corresponding in number to the selector push rods 11 of the phonograph and each manually movable in one direction to initiate the operation of mechanism governed thereby for accomplishing remote selection of a record. These selector elements are disposed side by side in suitable spaced relation and each has a segmental portion 49 at its pivot end and a forwardly-facing finger-engaging lever 50 projecting therefrom and extending through a companion upright slot 51 formed in the upper front wall of the casing 46. The levers of the respective selector elements are preferably arranged so that their finger-engaging portions are disposed in two horizontal rows and with the front ends of the lower row terminating short of the corresponding ends of the upper row to permit the proper finger-clearance for ready manipulation. In the normal elevated, non-selecting positions of these selector elements, their segmental portions are in registering axial alinement with the radial edges 52 thereof abutting a common oscillatory bar or yoke 53 spanning the several elements and pivotally suspended at its ends on the shaft 47. As shown in Figure 9, the slots 51 in which the levers 50 operate are numbered corresponding to the phonograph push rods 11 and are uniformly and progressively longer with their lower edges constituting stops for the levers and sloping from left to right so that each lever is permitted a proportionately longer downward stroke than its adjoining lever. The upper edges of the slots, however, are horizontally in line so that on the up-stroke of the levers they will be arrested at their initial alined positions. A spring 54 contacts the periphery of each lever-segment to latch or retain the respective selector elements in their normal position. By this construction, when No. 1 selector lever 50 is depressed it transmits a predetermined degree of movement to the yoke 53; when No. 2 selector lever is depressed it transmits a proportionately greater degree of movement to said yoke and so on, each succeeding lever to the right increasing the throw of the yoke for a purpose which will presently appear.

Fixed to one end of the yoke 53 axially of its pivot-shaft 47 to move therewith is a gear 55 meshing with a pinion 56 fixed on a shaft 57 parallel to the pivot shaft and journaled at its ends in the casing 46. Loosely mounted on the shaft 57 adjacent the pinion and tied to each other to rotate in unison are a gear 58 and a ratchet wheel 59, the latter being adapted to be actuated in one direction by a feed pawl 60 applied to the outer end of an arm 61 fixed on the shaft 57. Whenever a selector lever 50 is depressed, it actuates the yoke 53 and a like degree of movement is transmitted to the shaft 57 through the medium of the gearing 55, 56 and thence to the feed pawl and arms 60, 61, suffice it to say that when No. 1 lever, for example, is depressed, it turns the arm 61 backward or idly relatively to the ratchet wheel a distance approximately equal to one and a half teeth of the ratchet wheel and when No. 6 lever is depressed, it revolves such arm backward a distance of approximately six and a half teeth of the ratchet wheel and so on. This movement of the parts is, however, only a pre-setting or an initial adjustment preparatory to the actual remote control governing operations for automatically projecting the companion push button 11 of the phonograph to select position. Such turning of the shaft 57, and associated parts fixed thereto, in one direction is yieldingly resisted by a torsional spring 62 applied to the shaft and tending constantly to turn it, together with ratchet wheel 59 and gear 58, in the opposite or effective direction when a selector lever 50 is released to remotely govern the actuation of a companion phonograph selector-rod or button. The spring-urged movement of this shaft and associated parts in such opposite direction is arrested by a stop screw 63 disposed in the path of movement of the ratchet feed pawl 60, so that after said shaft and its associated parts are advanced a predetermined distance of 1 tooth, 2 teeth or more by the pawl, said screw arrests the like return movement of such parts. The number of teeth in the ratchet wheel 59 preferably exceeds the number of selector levers 50 by two, whereby to give the necessary clearance between the heel of the pawl 60 and the stop screw 63 when the pawl has ratcheted its maximum distance.

During the effective movement of the ratchet wheel 59 and gear 58 in a counter-clockwise direction, viewing Figure 7, motion is transmitted to a pinion 64 meshing with such gear and fixed on one end of a counter shaft 65 journaled in a suitable bearing bracket 66, said pinion being revolved one revolution for each tooth-distance of travel of the ratchet wheel. Mounted on the other end of this counter shaft is a crank disk 67 having a connecting link or bar 68 connected at one end thereto and at its other end to a freely oscillating disk 69 which may be loosely mounted on the shaft 57. Projecting from the connecting bar 68 is a pin 70 which oscillates back and forth in response to the turning of the crank disk and in the path of which is disposed a normally open switch 71 controlling the circuit of the solenoid 28, which latter in turn governs the ratchet wheel 24 for properly positioning the selector control arm 19 radially in register with the remotely-selected push rod 11. The oscillating disk 69 acts to retard the backward movement of the connecting bar so that the pin 70 will close the solenoid-controlling switch 71 with intervals of uniform duration, each closing action of the switch effecting a corresponding or synchronized movement of the ratchet wheel 24 with that of the ratchet wheel 59, the switch being momentarily closed and opened during each revolution of the pinion 64 or for each tooth distance of counter-clockwise travel of the said ratchet wheel 59.

Associated with the remote control unit or wall is a coin control switch device, which is so designed that a coin must be first deposited and then a selection of a desired record made at the wall box, firstly, to establish a circuit including the switch 71 which controls the solenoid 28 associated with the ratchet wheel 24 for setting the push button actuating arm 19 in radial alinement with that selector button at the phonograph companion to that selected at the wall box, and secondly, to establish a circuit which will cause the solenoid 34 to be energized to push the selected button 11 to select position and also start the phonograph in operation, subsequent to which operations the coin-established circuits are again opened and the parts controlled thereby restored to their initial positions. This coin-controlled switch mechanism for closing and opening the respective circuits at predetermined times is preferably constructed as follows:

Disposed in the path of the coin-chute (not shown) is a pivoted coin-intercepting paddle 72 whose arm 73 constitutes the movable element of a butterfly switch, the fixed element of such switch being indicated at 74 and connected by a wire 75 with the power line 76, while the companion movable switch element is connected by a wire 77 with the push button solenoid 34 whose coil is connected to the other power line 78. A vertically-tiltable beam 79 pivoted intermediate its ends at 80 has a shouldered portion 81 at one end disposed beneath the coin-intercepting paddle, so that when the coin engages the latter it swings it downward against the beam-shoulder and is temporarily arrested with the coin in a trapped position. This movement of the paddle is not sufficient, however, to close the switch 73, 74, but it does act to close a switch for governing the solenoid 28 controlling the push button control arm ratchet 24, such switch including the elements 82, 83, the fixed element 82 thereof being connected by a wire 84 with one of the contacts of the oscillating-pin controlled switch 71 whose other contact is connected to the power line 76. The movable element 83 of this solenoid-controlling switch is operatively associated with the pivoted paddle 72 so that it is tripped to closed position by a coin during the initial swing of the beam 79 to its arrested position against the beam-shoulder 81.

The beam 79 is normally yieldingly held in a substantially horizontal position to perform the aforesaid functions by a spring 85, which urges said beam against an upwardly-facing shoulder 86 formed on one arm of a tripping bell crank lever 87 pivoted at 88, the other arm of such lever having a pivoted trip dog 89 projecting therefrom and disposed in the path of a radial tappet arm 90 fixed on the shaft 57. This tappet arm, as shown in Figure 7, in the normal non-selective position of the parts, assumes a position to the right of the trip dog 89 and which is a position subsequent to a tripping operation. When a selection is made by depressing one of the selector levers 50, the tappet arm is moved to the other side of the trip dog simultaneously with the ratchet feed pawl arm 61 to a position as predetermined by the selector lever actuated. At the terminal end of the release stroke of the selector lever and after the companion ratchet feed lever 26 has moved its ratchet wheel 24 and selector control arm 19 to a position alined with the push button selected by such lever, the tappet arm 90 encounters the trip dog 89 and rocks the bell crank lever 87 in a direction to rock the beam 79 against the resistance of its spring 85, thereby lowering the right hand end of the beam, viewing Figure 6, to release the trapped coin and cause the paddle 72 to be pivoted sufficiently to close the switch 73, 74. This causes the button-press-solenoid 34 to become energized to automatically shift the companion remotely-selected pushbutton of the phonograph to a selective position. Simultaneously with this operation, the motor 91 of the phonograph is closed through the medium of a magazine switch 92 connected in series with the solenoid 34 whereupon the record selected is brought into a playing position and played.

When the trapped coin is released and allowed to drop by gravity into the coin-box, the beam 79 and tripper paddle return to their initial positions and the circuit is again broken at the switches 73, 74 and 82, 83, causing the button press solenoid plunger 20 with its selector control arm 19 to return to its initial position under the tension of the spring 35.

During the restoring movement of the solenoid-plunger 20, means are provided for closing the circuit of the ratchet release magnet 38 to release the pawl 36 from the ratchet wheel 24 and permit the latter and the parts movable therewith to return to their initial or selector-starting position under the action of the spring 32. For this purpose, a normally open switch 93, 94 is provided, the fixed element 93 thereof being connected by a wire 95 with the coil of the magnet 38 which is likewise connected to the power line 78, while the movable element 94 of this switch is connected to the other power line wire 76. Applied to the solenoid-plunger 20 and in the path of the movable switch element 94 is a trip dog 96, which, on the return movement of the plunger to its initial position encounters and momentarily closes the switch 93, 94 to release the pawl 36 from the ratchet wheel 24. As previously described, the pawl is thereupon held in such released position by the keeper 41.

Should it be desired to cancel any previously selected push rods 11 at the instrument, this may be effected by a cancelling button or rod 97 disposed axially of the selector button panel 10 and guided for axial movement in the hollow front end of the solenoid-plunger 20. In forked engagement with this cancelling rod for actuation thereby is a horizontally-swinging lever 98 pivoted at 99 to a stud 100 and connected at its free end to a link 101 joined at its rear end to the cancelling plate 102. Upon depressing the cancelling button, the plate 102 is pulled forwardly to abut the collars 18 of any projected selector rods 11 and return such rods to non-selecting position. As shown in Figure 4, the collar 21 on the front end of the solenoid-plunger 20 may be additionally supported on a bar 103 slidably mounted on the stud 100 and in forked engagement with an annular groove 104 in said collar.

In the modified form of the remote selecting mechanism shown in Figures 11 and 12, a rotatable selector or dial plate 105 is provided which is employed instead of the selector levers 50 of the previous construction and wherein the mechanism associated with such levers, such as the motion-transmitting gear 55 and pinion 56 to the shaft 57 are eliminated, and the shaft actuated directly by the dial plate. To this end the dial plate is fixed on the shaft 57a to directly transmit motion thereto when selecting a given record, the dial plate having finger-engaging openings 106 therein corresponding in number to the phonograph push buttons, a finger-abutment 107 being provided for arresting the turning of the dial plate in a clockwise direction when selecting a given record for play. The remaining parts employed with this form of the invention are identical with those of the previous construction and for this reason have been identified with the same reference characters. If desired, and as shown in Figure 11, the tilting beam 79 for releasing the trapped coin, heretofore described, may be eliminated, in which case the pivoted trip dog 89 is applied to the upper arm of a straight lever 108 provided at its lower end with a laterally-bent portion 109 which extends beneath and serves to arrest the complete pivoting of the coin-intercepting paddle 72 until such lever is rocked to do so by the tappet arm 90 in the manner heretofore described.

Briefly described, the operation of the remote control device is as follows:

The patron first deposits a coin, say, a nickel in the coin slot (not shown) of the wall box, which closes the circuit at the switch 82, 83, after which the patron pulls down the lever 50 corresponding to the record at the phonograph desired for play. This downward movement of the lever transmits motion to the ratchet pawl arm 61 in a clockwise direction, viewing Figure 7, the pawl 60 idling over the number of teeth corresponding to the number of the selector lever depressed. If lever numbered 3 is depressed, the pawl will idly ratchet over three teeth of the ratchet wheel 59. This movement of the parts stores up energy to transmit an operative stroke to the ratchet wheel 59 in a counterclockwise direction, and for each tooth distance of travel of the ratchet wheel in such direction the oscillating-pin-controlled switch 71 is closed and opened once, due to the pinion 64 making one revolution for each tooth distance of travel of the ratchet wheel. The closing of the switch 71 energizes the magnet 28 to correspondingly advance the ratchet wheel 24 a like distance and bring the push button control arm 19 into registering relation with the phonograph push button 11 companion to that selected at the wall box. After the ratchet wheel 59 has completed the end of its registered selective stroke, the tappet arm 90 encounters the trip dog 89 and swings the crank lever 87 in a direction to unlatch the beam 79 therefrom and permit the coin, which was heretofore trapped by the paddle 72 abutting the shoulder 81 of such beam, to be released and drop by gravity into the coin box. Simultaneously with this movement, the switch 73, 74 is closed to energize the solenoid 34 and project the control arm 19 in a direction to push the alining phonograph button 11 to a selective position. Simultaneously with the closing of the switch 73, 74, the magazine switch 92 is closed and the motor circuit of the phonograph closed to start the instrument playing. After the tripped coin has been released, the circuit is again broken at the switch points 73, 74, and 82, 83, to de-energize the solenoid 34 and restore the button control arm 19 to its initial position and to also break the circuit at the wall box and leave it dead until another coin is deposited and a record selected. During the axial return of the control arm 19 to its initial position, the trip dog 96 closes the switch 93, 94 to energize the escapement pawl ratchet magnet 38 to release the pawl 36 from the ratchet wheel 24 and permit the latter to return to its initial position under the tension of the spring 32.

The operation of the modification of the invention employing the dial control is identical with that just described, the only difference being that when a given record is selected by dialing the record number desired, the motion thereof is directly transmitted to the ratchet wheel 59.

I claim as my invention:

1. Means for remotely controlling a row of selector elements, comprising a control member common to and disposed in operative relation to said selector elements for selective movement in registering alinement with one or another of said elements and for an operative movement in a direction to project an alining selector element to selecting position, a selector device remotely stationed from and including a row of manual selective elements companion to said first-named selector elements, and means operatively interposed between said selector device and said control member for governing the selective and operative movements of the control member.

2. Means for remotely controlling a plurality of selector elements, comprising a selector device companion to the selector elements and manually adjustable to record-selecting positions, a ratchet feed mechanism operatively connected to said selector device for actuation thereby a predetermined distance in accordance with a given selection made, and means operatively connected to and governed by said ratchet feed mechanism and disposed in operative relation with the selector elements for actuating them to selecting positions.

3. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, means disposed in operative relation to said selector elements for movement relatively thereto into registering relation with one or another of such elements and in a direction to actuate them to selecting positions, and means interposed between said selector-element-actuating means and said ratchet feed mechanism and operatively connected to the latter for governing the actuating means of the selector elements.

4. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, an adjustable actuating arm movable to selective and projectable positons for actuating one or another of said selector elements to a selecting position, a ratchet feed mechanism in synchronized operative engagement with the feed mechanism of said selector device for adjustably governing the movement of the selector-element-actuating arm to selective positions, and means for actuating said arm to a projected position to operate a given selector element to a selecting position.

5. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, an adjustable actuating arm movable to selective and projectable positions for actuating one or another of said selector elements to a selecting position, a ratchet feed mechanism operatively connected to said actuating arm for moving it to selective positions of adjustment, electrically-controlled means connected to said last-named feed mechanism and governed by the feed mechanism of said selector device for actuating the feed mechanism of said actuating arm, and electrically-controlled means connected to the selector-element actuating arm and governed by and at a predetermined time in the operation of the selector device feed mechanism for actuating said arm to a projected position to operate a given selector element to a record-selecting position.

6. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, said mechanism including a ratchet wheel having at least as many teeth thereon as there are selector elements and being movable a predetermined distance of one or more teeth in accordance with each given adjustment of the selector device, means disposed in operating relation to said selector elements for movement relatively thereto into registering relation with one or another of such elements and in a direction to actuate them to selecting positions, and means for rendering the selector-element-actuating means operative in response to a selection made at the selector device including an electric circuit, an electrical device in said circuit and operatively connected to said selector-element-actuating means for transmitting a movement thereto companion to that of the feed mechanism ratchet wheel, a normally open switch in said circuit for controlling said electrical device, and means having an operative connection to said ratchet wheel for effecting the closing of said switch for each tooth movement of said wheel.

7. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, an adjustable actuating arm movable to selective and projectible positions for actuating one or another of said selector elements to a record-selecting position, a ratchet feed mechanism operatively connected to said actuating arm for moving it to selective positions of adjustment, and an electric circuit for governing the respective movements of said selector-element-actuating arm including electrical devices operatively connected, respectively, to the ratchet feed mechanism of said arm and to such arm for selectively adjusting and projecting it to a position to operate a given selector element to a selecting position, and switch means in said circuit and governed by the ratchet feed mechanism of said selector device for causing at predetermined times the successive operation of said electrical devices, respectively.

8. Means for remotely controlling a plurality of selector elements, comprising a control member disposed in correlation with said elements and selectively movable in a plane for registering alinement with one or another of them and movable in a direction to actuate an alined selector element to a selective position, a plurality of remotely-disposed manually-selective elements corresponding in number to the selector elements, a selector-registering member correlated with said remote selective elements and movable to different selective positions, means governed by the remote selective elements for actuating said selector-registering member to a selective position companion to the element selected, means operatively connected to and synchronized with said selector-registering member for moving said control member in registering alinement with the selector element remotely selected, and means for actuating said control member in a direction to move such registered selector element to a selective position.

9. Means for remotely controlling a plurality of selector elements, comprising a control member disposed in correlation with said elements and selectively movable in a plane for registering alinement with one or another of them and movable in a direction to actuate an alined selector element to a selective position, a plurality of remotely-disposed, manually-selective elements corresponding in number to the selector elements, a selector-registering member correlated with said remote selective elements and movable to different selective positions, means governed by the remote selective elements for actuating said selector-registering member to a selective position companion to the element selected, means operatively connected to and synchronized with said selector-registering member for moving said control member in registering alinement with the selector element remotely selected, means for actuating said control member in a direction to move such registered selector element to a selective position, and patron-controlled means for governing the sequence movements of said selector-registering member together with the means synchronized therewith and the actuating means for moving the control member to selective-governing position.

10. Means for remotely controlling a plurality of selector elements, comprising a control member disposed in correlation with said elements and selectively movable in a plane for registering alinement with one or another of them and movable in a direction to actuate an alined selector element to a selective position, a plurality of remotely-disposed, manually-selective elements corresponding in number to the selector elements, a selector-registering member correlated with said remote selective elements and movable to different selective positions, means governed by the remote selective elements for actuating said selector-registering member to a selective position companion to the element selected, electrical devices operatively connected to said control member for moving it to registering alinement with one or another of the selector elements and in a direction to actuate an alined selector element, respectively, an electric circuit including said electrical devices, switch means in said circuit and operatively governed by said selector-registering member for controlling the electrical device governing the registering movement of the control member, and a device including a switch in said circuit for initiating the closing thereof to render the last-named electrical device operative, said device including a second switch adapted, at a predetermined time, to render operative the electrical device for actuating the control member to selective-governing position.

11. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, an adjustable actuating arm movable to selective and projectible positions for actuating one or another of said selector elements to a selecting position, a ratchet feed mechanism operatively connected to said actuating arm for moving it to selective positions of adjustment, and an electric circuit for governing the respective movements of said selector-element-actuating arm including electrical devices operatively connected, respectively, to the ratchet feed mechanism of said arm and to such arm for selectively adjusting and projecting it to a position to operate a given selector element to a selecting position, switch means in said circuit and governed by the ratchet feed mechanism of said selector device for causing at predetermined times the successive operation of said electrical devices, respectively, and a second switch in said circuit for initially preparing it for closure by said first-named switch means.

12. Means for remotely controlling a plurality of selector elements, comprising a selector device companion to the selector elements and manually adjustable to selecting positions, a ratchet feed mechanism operatively connected to said selector device for actuation thereby a predetermined distance in accordance with a given selection made, an adjustable actuating arm movable to selective and projectible positions for actuating one or another of said selector elements to a selecting position, a ratchet feed mechanism operatively connected to said actuating arm for moving it to selective positions of adjustment, and an electric circuit for governing the respective movements of said selector-element-actuating arm including electrical devices operatively connected, respectively, to the ratchet feed mechanism of said arm and to such arm for selectively adjusting and projecting it to a position to operate a given selector element to a selecting position, switch means in said circuit and governed by the ratchet feed mechanism of said selector device for causing at predetermined times the successive operation of said electrical devices, respectively, a switch in said circuit for initially preparing it for closure by said first-named switch means, means for releasably limiting said switch in such switch-prepared position, and trip mechanism operatively connected with said limiting means and governed by the ratchet feed mechanism of the selector device for releasing such means at a predetermined time in the operation of said ratchet feed mechanism.

RUSSELL I. WILCOX.